(12) United States Patent
Schirmer et al.

(10) Patent No.: US 6,829,615 B2
(45) Date of Patent: Dec. 7, 2004

(54) OBJECT TYPE RELATIONSHIP GRAPHICAL USER INTERFACE

(75) Inventors: Andrew L. Schirmer, Andover, MA (US); James Goodwin, Beverly, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,767

(22) Filed: Feb. 25, 2000

(65) Prior Publication Data

US 2003/0131007 A1 Jul. 10, 2003

(51) Int. Cl.$^7$ ................................................ G06F 7/00
(52) U.S. Cl. ...................................... 707/102; 345/853
(58) Field of Search ........................ 707/7, 102; 703/1; 434/322; 345/145, 968, 580–660

(56) References Cited

U.S. PATENT DOCUMENTS

| | | | |
|---|---|---|---|
| 5,598,557 A | | 1/1997 | Doner et al. |
| 5,625,767 A | | 4/1997 | Bartell et al. |
| 5,715,432 A | * | 2/1998 | Xu et al. ..................... 345/764 |
| 5,832,476 A | | 11/1998 | Tada et al. |
| 5,926,812 A | | 7/1999 | Hilsenrath et al. |
| 5,933,823 A | | 8/1999 | Cullen et al. |
| 5,933,827 A | | 8/1999 | Cole et al. |
| 5,970,483 A | | 10/1999 | Evans |
| 5,982,370 A | | 11/1999 | Kamper |
| 6,031,537 A | * | 2/2000 | Hugh ........................ 345/854 |
| 6,131,095 A | * | 10/2000 | Low et al. .................... 707/10 |
| 6,141,658 A | * | 10/2000 | Mehr et al. .................... 707/7 |
| 6,272,507 B1 | * | 8/2001 | Pirolli et al. ................ 707/513 |
| 6,315,572 B1 | * | 11/2001 | Owens et al. ............... 434/118 |
| 6,317,116 B1 | * | 11/2001 | Rosenberg et al. ......... 345/163 |
| 6,353,830 B1 | * | 3/2002 | Yee et al. .................... 707/101 |
| 6,360,188 B1 | * | 3/2002 | Freidman et al. ............ 703/1 |
| 6,401,103 B1 | * | 6/2002 | Ho et al. .................... 707/201 |

OTHER PUBLICATIONS

Edwards, Lisa, "White Paper: Managing Knowledge for Competitive Advantage," www.knowledgex.com, 10 pages (Jul. 1997).
"KnowledgeX FAQ's" from www.knowledgex.com, 15 pages (7/98).
Usey, Robert W., and Simpson, Don M., "KnowledgeX KORE™" white paper, www.knowledgex.com, 11 pages (7/98.

* cited by examiner

Primary Examiner—Greta Robinson
Assistant Examiner—S R Pannala
(74) Attorney, Agent, or Firm—Mintz Levin Cohn Ferris Glovsky and Popeo PC

(57) ABSTRACT

A computer- and software-based apparatus and method is disclosed for managing and presenting information as a domain of data objects which can be grouped according to their category or "object type," and which can be associated with other data objects, of same or differing object types, according to a myriad of relationship types. The system and method present the network of objects using a computer-generated graphical user interface (GUI) which may comprise a series of tables or trees or other means for representing a set. The invention provides for display of a primary object set comprising a plurality of primary data objects sharing a common object type. On the same or a related GUI display, a plurality of other object sets, known as "secondary object sets," are displayed in order to present data objects related to the data objects of the primary object set. When a data object in the primary set is selected (by cursor or similar means), each of the secondary object sets will display data object related to the selected data item in the primary set. This "relationship traversal" allows the user to explore the network and ascertain relationships between data objects. The system and method also provide various additional functions to explore and analyze the data, including sorting, attribute filtering, context filtering and view pivoting. Relationship traversal and the additional functions allow the user to view structure and detail at the same time, and to engage in "data mining" to appreciate previously unappreciated relationships between discrete data objects.

42 Claims, 11 Drawing Sheets

View by Person

| Name ▶ | Relevance ▶ |
|---|---|
| Emile Schmidt | 96 |
| Lawrence Schmitt | 95 |
| Ben Silverman | 90 |
| Ella Shwimmer | 88 |
| Amanda Smathers | 87 |
| Joe Smith | 84 |
| Gerry Smith | 82 |
| William Smith | 82 |
| Douglas Smith | 81 |
| Randall Smythe | 81 |
| Adrian Swensson | 81 |
| Noah Swinson | 80 |
| Mandy Swinton | 79 |
| Alice Tabor | 70 |
| Edgar Taylor | 62 |
| Phil Teel | 61 |
| Gerald Tildon | 60 |
| Ralph Tilson | 60 |
| Steven Tilton | 59 |

— 905

Documents Linked to This Person — 915

| Document Title ▶ | Relevance ▶ |
|---|---|
| Storage optimization tec... | 98 |
| Database storage meth... | 96 |
| A methodology for repre... | 96 |
| File systems for databa... | 95 |
| Scatter/Gather. A cluster... | 90 |
| Query Previews in an... | 88 |
| A direct manipulation... | 88 |
| Internet browsing and... | 85 |
| Graphical query spec... | 82 |

Topics Linked to This Person — 920

| Topic Title ▶ | Relevance ▶ |
|---|---|
| Encryption | 97 |
| Data Encoding | 93 |
| Documentation | 90 |
| Representations | 88 |
| Storage Hierarchies | 88 |
| Archiving | 85 |
| Sorting/Searching | 85 |
| Sorting and Searching | 82 |
| Query Processing | 80 |

People Linked to These Documents — 925

| Name ▶ | Relevance ▶ |
|---|---|
| Marti Harley | 88 |
| Stuart Collard | 88 |
| Jock Miller | 85 |
| Brian Jackson | 82 |
| Douglass Cole | 80 |
| Joel Erving | 79 |
| Steven Parsons | 70 |
| Donna Rolling | 62 |
| Gerald Tildon | 62 |

FIG. 9

OBJECT TYPE RELATIONSHIP GRAPHICAL USER INTERFACE

FIELD OF THE INVENTION

The present invention relates generally to a computer- and software-based system and method for viewing a domain of information represented as a network of data objects that are connected or associated by relationships. The domain of information is presented to a computer system user via a graphical user interface permitting the domain to be viewed along various data object type axes so the context and relationships are revealed and both structure and detail are presented at the same time.

BACKGROUND OF THE INVENTION

The so-called modem "information age" has meant that more people have access to more information that at any point in human history. The proliferation of the Internet, World Wide Web, organizational intranets and e-mail has meant that information about nearly any topic is almost immediately accessible.

In fact, information is not merely readily "available." Huge amounts of information is often targeted to individuals who scarcely have time to view and process it. Thus, the second—and ongoing—stage of the information age revolution is the well-documented problem of "information glut." In short, so much information is available, much of it targeted, that it overwhelms even the most dedicated person. It is not uncommon, for example, to hear of overwhelmed corporate executives spending hours each day sifting through hundreds of e-mails. Virtually every user of the Internet has experienced the frustration of seeking information on a topic by using a "search engine," only to receive hundreds of thousands or even millions of "hits."

In the organizational context, the problem of information glut is particularly acute. For example, a profit-oriented business organization may have hundreds or thousands of employees and support personnel. Each may have a different title, role, specialty, education and job history. Each may work on several different projects. Each may generate thousands of e-mails per year. Each may generate dozens or hundreds of documents per year. Each document may have several recipients. The organization may have several different departments, each having a number of product lines. The organization may have a number of geographically separated sites or factories. The organization may have a number of corporate affiliates, such as partly or wholly owned subsidiaries or parent organizations. The organization may be associated with a number of suppliers, support entities, dealers, distributors, retailers and so forth.

As can be appreciated, the aforementioned various aspects or attributes of an organization represent information or organizational "knowledge." An organization is more efficient if it can manage—that is, collect and process—this information so as to derive the inherent benefits of this organizational knowledge. In an era where "information is power," the effective management of organizational knowledge can be the difference between enterprises that fail and those that thrive.

As mentioned above, the problem of "information glut" is particularly acute in the organizational context. This is partly because of the pure "heft" or quantity of information. This is the case also because of the many relationships between discrete pieces of information or "data items." These relationships not only present issues as to how the data items should be organized and presented; the interrelationships between data items represent information in themselves. In fact, discerning otherwise not-readily-apparent relationships is very often the key to truly understanding data items. The difficulty, however, and the challenge of organizational knowledge management, is that as the number of data items increases, the number of interrelationships tends to increase even faster, to the point where the capacity of the human brain to process and order this information is quickly overrun.

Several approaches to more effectively managing information in the computer age have been proposed and have fallen substantially short. So-called "push" technology has been used to automatically and selectively retrieve information from the Internet so that users receive only what they want. Typically, the user identifies topics or sites of interest, and a server will periodically retrieve updated information to be downloaded in the form of browser pages or a screen saver with summaries and links to additional information. One example of push technology is the product previously marketed as PointCast™ (and, more recently, as EntryPoint™) by PointCast, Incorporated. However, push technology suffers from the drawback that it does not reveal relationships between distinct data items. Nor does it allow for the presentation of multiple data items so as to present detail and structure at the same time. In short, push technology may alleviate some of the information glut for the solitary Internet user, but it has little application to the organizational knowledge problem described above.

Another attempt to solve the information glut problem has been so-called "data mining," such as the Suite 101™ on-line "community-based web guide" offered by the Mining Company at the site www.suite101.com. In this approach, dedicated editors retrieve and review information on a variety of topics from selected sites on the Internet. Somewhat analogous to the "thumbs-up, thumbs-down" paradigm for reviewing movies and the theater, these editors attempt to direct users to the best of the Internet through the use of summaries and reviews. However, data mining technology suffers from the same drawbacks as push technology when it comes to application in the organizational knowledge context.

Other approaches to processing distinct but interrelated data items include so-called "fuzzy logic" and "neural network" (sometimes loosely referred to as "artificial intelligence") processing algorithms. Speaking broadly, these approaches attempt to emulate the ability, if not the processing "architecture" outright, of the human brain insofar it is able to "sift" and "synthesize" otherwise unconnected pieces of data to discern new and broader meanings. Despite some of the initial fanfare which suggested that such automated systems would be able to "learn" and "think," they have found little meaningful application outside of the scientific realm.

In sum, in an era that can be characterized as having increased organizational concentration, complexity, and competitiveness, the ability to process and discern the meaning of the huge quantity of organizational information remains a significant and, to date, unsolved problem.

Other problems and drawbacks exist.

SUMMARY OF THE INVENTION

Accordingly, it is one object of the present invention to overcome one or more of the aforementioned and other limitations of existing systems and methods for managing and processing discrete pieces of information, particularly in the context of an organization. The largely unfulfilled promise of artificial intelligence technologies and the like indicates that the human brain can be the superior processor, but only if the information can be presented without overwhelming the user. This is the significant challenge the present invention meets.

For these and like reasons, what is desired is a computer-based system and method for representing a domain of information as a network of data objects connected or associated by relationships so that both detail and structure are discernible.

It is another object of the invention to provide a computer-based system and method for representing such a domain of information where multiple types of data objects can be presented which are associated by multiple types of relationships.

It is another object of the invention to present such a domain of information whereby information can be derived by selecting a node object in a primary object set in order to establish its relationships to other, related node objects in secondary object sets.

It is yet another object of the computer-based system and method to present the domain of information as network in the form of a dynamic table of data objects which can be pivoted to show data objects in their various contexts and present different views of the same information.

It is another object of the invention to present such a domain of information whereby any object type is a valid entry point into the network of objects and, specifically, whereby any object type can be selected as the primary set to be displayed with related secondary sets of data objects.

It is another object of the invention to display groups of data objects as object sets so as to reveal common traits or attributes.

It is another object of the invention to allow data objects to be selected in order to present related data objects in order to reveal unsuspected relationships.

It is another object of the invention to present such a domain of information comprising a universe of data objects, each comprising an object type, and each object type having one or more attributes, the attributes capable of application to filter a list of data objects according to selected attribute values or entries.

It is another object of the invention to present such a domain of information providing context filtering whereby the domain context for a first data object in a first primary data set can be filtered by a related second data object in a secondary data set such that the remaining secondary data sets present only data related to both the first data object and the selected second data object.

It is yet another object of the invention to provide said context filtering in multiple dimensions across data sets such that cross-relationships between data objects in multiple data sets can be discerned.

To achieve these and other objects of the present invention, and in accordance with the purpose of the invention, as embodied and as broadly described, an embodiment of the present invention comprises a computer- and software-based apparatus and method (sometimes referred to herein as the Object Network Viewer™) for managing and presenting information of an organization, undertaking or entity. The system and method present the information as a domain of data objects which can be grouped according to their category or "object type," and which can be associated with other data objects, of same or differing object types, according to a myriad of relationship types.

The system and method present the network of objects using a computer-generated graphical user interface (GUI) which may comprises a series of tables or trees or other means for representing a set. The system and method may be integrated with a database for storing the underlying data, such as Lotus Notes™. In one embodiment, the invention provides for display of a primary object set comprising a plurality of primary data objects sharing a common object type. On the same or a related GUI display, a plurality of other object sets, known as "secondary object sets," are displayed in order to present data objects related to the data objects of the primary object set. When a data object in the primary set is selected (by cursor or similar means), each of the secondary object sets will display data objects related to the selected data item in the primary set. In this manner, when the user selects a data object in the primary object set, links to other related data objects (of the same or differing object type) are identified in the domain of information.

Each data type may have a series of attributes (e.g., name, size, date of creation, and so forth) that may be displayed with the data items in the primary (or secondary) object set, and which can further be used to order or filter the object set.

The system and method enable the user to "narrow the context" of a selected data object in the primary object set by further selecting one or more data objects in related secondary object sets. The result is that the remaining secondary object sets will emphasize the data objects which have relationships to each of the selected primary data object and the selected secondary data object(s). The effect of this "context filtering" operation is to emphasize or identify otherwise unapparent cross-relationships between three or more data objects.

The system and method further supports the presentation of the data objects along multiple data type axes, so-called "view pivoting," in order to view data in different contexts or domain dimensions. Because any object type is a valid "entry point" into the object network, the domain can be viewed with any object type as the primary set. By selecting (e.g., by cursor or so-called "drop-down menu") a secondary data object, the corresponding secondary object set becomes the primary object set, and the primary object set now becomes a secondary object set. This allows the user to view the same sub-network of data along different object type axes so as to discern new relationships, context and, ultimately, meaning.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 9 is a diagram of a display which results when a user selects a related secondary data object to undertake view pivoting such that the secondary object set becomes the primary object set and the secondary data object becomes the departure node.

DETAILED DESCRIPTION OF THE INVENTION

Figure 1:
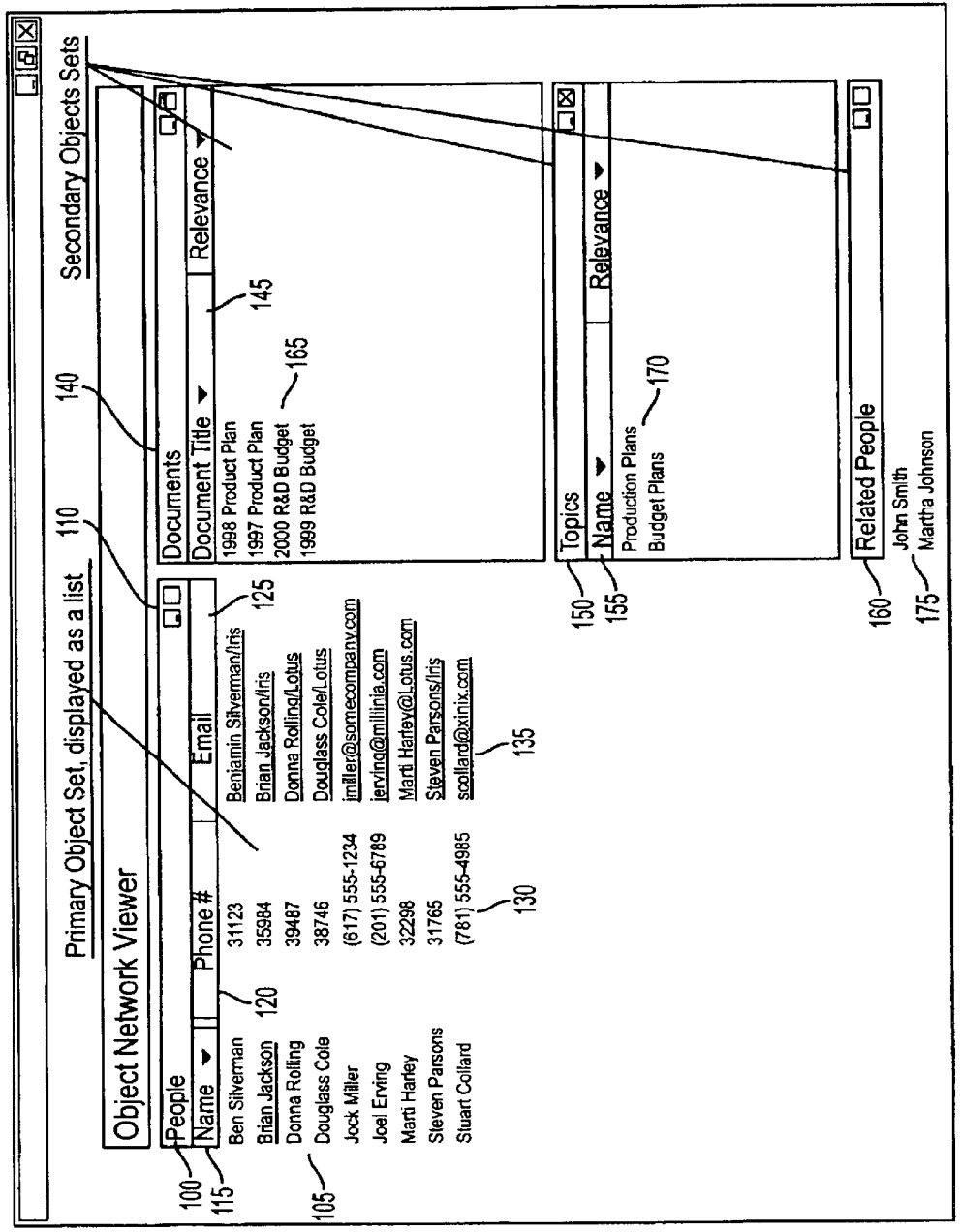
FIG. 1 is an overview diagram of a display for explaining the general principles of the invention, including a primary object set and related secondary object sets.

As discussed above, the present invention is generally directed to a graphical user interfaced (GUI) system and methods for presenting a domain of information as a network of data objects which are associated or connected by relationships. Data objects (sometimes referred to as "data items") can be grouped or categorized as object types, of which there may be many. Thus, "Ben Silverman" and "Brian Jackson" are data objects that fall within the "people" object type. On the other hand, "recruiting new MBA graduates" and "annual shareholder's meeting" may be data objects falling within the "topic" object type. Generally, therefore, each object type has a universe of constituent members or data objects. Relationships may exist between data objects of different object types (e.g., a person-topic relationship) or between data objects of the same object type (e.g., a person-person relationship).

An "object set" comprises a group of data objects of a given object type. "Attributes" represent traits or characteristics associated with a given object type, although not all object types necessarily have associated attributes. For example, the "people" object type may have the following attributes: phone number, e-mail address, position/title, and so forth.

These features of the present invention form the taxonomy or structure for presenting the domain of information in a fashion that shows detail and structure at the same time. Moreover, it facilitates various filtering means so as to view information in different perspectives in order to reveal otherwise unapparent contextual information and hidden relationships.

According to the taxonomy for the domain of information, the network of objects are connected by relationships whereby knowledge can be derived by selecting any particular "node" data object and following its relationships to other node objects. The invention includes a software-based application providing a graphical user interface (GUI) (referred to as the Object Network Viewer™ or ONV) for presenting the networked information as a set of data objects of many object types that has "many-to-many" links. The system, which comprises the ONV software and associated hardware platform(s), represents the network as a dynamic group of object sets that can be "pivoted" to show data objects in various, different contexts. Generally, the domain is represented as lists of data objects, although the data could be displayed in other ways, such as cells in a table, hierarchical trees, and so forth, without departing from the fundamental principles of the invention. So-called "metadata" is displayed as labels for columns of data in the lists. Data objects with common traits are grouped together to provide context, and contexts can be filtered to focus on particular traits. Lists can also be ordered in different ways to provide different contexts.

The system and method rely on an underlying database for storing the network of objects. In the preferred embodiment, this comprises a relational database such as Lotus Notes™, although the database could be non-relational, could be customized, or could be based on various other commercially available database software platforms.

An Overview of the Principles of the Invention

FIG. 1 provides an overview of a GUI display according to the present invention. The primary object set is of the "people" object type, as indicated in primary object set title bar 100. Primary object set 100 includes nine data objects, the listed individuals beginning with Ben Silverman and ending with Stuart Collard, as indicated by list 105. So-called "metadata" includes name 115, phone # 120 and e-mail 125. Name 115, phone # 120 and e-mail 125 are attributes of the object type, and identify the names 105, telephone numbers 130 and e-mail addresses 135 for the data objects listed. As will be discussed below, these attributes can be used for ordering of the object set and for list filtering, to be discussed further below. Software buttons 110 comprise typical minimize and maximize GUI buttons for controlling the presentation.

Documents 140 is the first secondary object set and lists document titles 145 associated with selected members of primary object set 100. Topics 150 is the second secondary object set and will list topic names 155 associated with selected members of primary object set 100. Related people 160 is the third secondary object set and will list persons related to selected members of primary object set 100.

The general operation of the invention is now described according to FIG. 1. Individual data objects in primary object set people 100 can be selected so as to display related data objects in secondary object sets 140, 150 and 160. Thus, if Brian Jackson is the selected data object (indicated here by the underscore, although it could be by other means such as highlight, italicize and so forth), documents 165 associated with him, topics 170 associated with him, and people related to him 175 are displayed in the secondary object sets. If the ONV user selects a different data item (e.g., Joel Erving), then the secondary object sets 140, 150 and 160 will be modified accordingly to display those documents, topics and people related to the new selected primary data object.

As can be appreciated from the overview diagram of FIG. 1, multiple relationships can be presented in multiple perspectives according to the present invention. For the first three object types of FIG. 1 (people, documents and topics), the following relationships can be discerned and displayed according to the present invention: people-document, document-people, people-topic, topic-people, document-topic, and topic-document. For the single set of data comprising people 100, documents 140 and topics 150, the present invention permits multiple views of that data to discern the six different relationships described above. Hidden relationship and context information is further ascertained by the various sorting and filtering operations, to be described below.

In general, there is a secondary object set for each object type that has a relationship to the object type displayed in the primary object set. The configuration of the secondary object sets is generally the same as the primary object set, although the selection behavior differs. It should also be noted that the secondary object set may have an object type that is the same as the object type in the primary object set. Thus, as depicted in FIG. 1, there may be a secondary object set 160 of people objects who are related to the person selected in primary people object set 100.

Ordering of Sets

The displayed sets may have a default order, which may be established according to the nature of the data and the task to be performed. For example, a people object set may be sorted alphabetically. An object set of e-mail messages may have a default sort according to the date they were sent or received. Object sets can be sorted in different ways using the attributes of an object type. In one embodiment of the invention, attributes displayed for an object set can be used as a sort key. To sort on an attribute, the user clicks on or selects the label so as to toggle between unsorted (default), sorted ascending, and sorted descending. For example, in FIG. 1, primary object set 100 can be sorted by clicking on name 115 (toggle between alphabetical and reverse alphabetical), phone # 120 (toggle between ascending and descending based on first number) and e-mail (toggle between alphabetical and reverse alphabetical). The attribute labels may include indicia that the sort function has been enabled, such as a down arrow (descending) or up arrow (ascending). Secondary object sets can also be sorted in a similar fashion. They may have a default sort order, and their attributes may be selected and used as sort axes.

List Behavior or Relationship Traversal

As touched upon above, when the user selects a data item in the primary object set, the ONV traverses relationships (we call this the "relationship traversal" function) from that item to the other object types in the system and displays them as the contents of the secondary object sets. Thus, if the primary object set is a list of people and the secondary object sets are documents and topics, choosing a particular person in the primary object set will display documents and topics related to that person. Choosing a different person in the primary object set causes the secondary object sets to change to reveal the items related to that person. By scrolling between different data objects selected as the current object in the primary set, the user garners important information. The user ascertains what relationships exist with data objects in other, secondary object sets. The user also develops a sense of the comparative nature and scope of relationships as between data objects within the primary set. For example, if selecting Brian Jackson in FIG. 1 causes four documents to be displayed in secondary object set documents 140, but selecting Stuart Collard causes twenty-seven documents to be displayed, the user can infer information about the relative time these individuals have been employed or their relative productivities.

List Filtering

The ONV provides sorting by grouping similar items in an object set. The ONV also provides a filtering means for reducing the number of visible items in a set. This can be accomplished by filtering object sets according to their attributes using a dropdown menu or the like to select or deselect particular attribute objects. For example, a people set may include a "role" attribute including the following attribute objects: "author," "editor," "sender" and "recipient." The user clicks on the dropdown menu and selects the "role" attribute, which causes the ONV to provide the list of valid "values" for that attribute (i.e., author, editor, sender and recipient). The user then selects the attribute objects to be applied as filters, for example, author and recipient, which causes the object set to display only those data objects having one of the selected attributes. In this example, those people objects having a role attribute that is editor or sender will no longer be displayed. The user can cancel the effect of the filtering by selecting all of the attribute objects in the list or choosing an "all" item in the dropdown menu for the pertinent attribute. Alternatively, the ONV may provide a "cancel filters" menu selection for canceling all attribute filters.

In other embodiments, filtering may involve color coding or other graphic-distinguishing means (e.g., use of different fonts, highlights, bolds, italics). In one embodiment, those data objects meeting the filtering criteria are displayed using a first color or font or other graphically distinguishable feature, while those data objects not meeting the criteria are displayed using a second color, font or graphically distinguishable feature. In yet another embodiment, data items failing to meet the criteria are deleted, and the remaining data items are displayed in different colors using a different color for each attribute object.

It should be appreciated that the list filtering function may be used for both primary object sets and secondary object sets. Of course, if an object set is of an object type having no attributes, list filtering is inapplicable.

Context Filtering

Context filtering provides the user a means to narrow the current context for a given data object in the primary object set by selecting one or more data objects in the secondary object sets. The selected secondary data object(s) acts as a filter on the objects in the remaining secondary object sets such that cross-related data objects are emphasized. By emphasized, it is meant that the cross-related objects are highlighted, color-coded, underscored, italicized, or otherwise graphically modified to distinguish them from non-cross-related data items in the remaining secondary object sets. Of course, the cross-related items could be "emphasized" merely by removing the non-cross-related data items from their respective lists.

By cross-related, it is meant that the emphasized items are related to both the current item in the primary object set (POS) and the selected item(s) in the secondary object set (SOS) being used as a filter. For example, using a people-documents-topic display generally similar to FIG. 1, the use may select "Bob Smith" as the selected data object in the primary object set. The first secondary object set displays topics related to Bob Smith, including "piano," "piano composition," and "conducting." The second secondary object set lists documents related to Bob Smith, including "Concert Technique," "Piano Composing Guide," "Young Conductor," and "Beginning Composition." A third secondary object set lists persons related to Bob Smith, including "Stewart Jones," "Molly Evans," and "Monica Swanson." Table 1 below depicts the object sets for this example, with Bob Smith being bolded and underscored to indicate that it is the selected data object in the primary object set:

TABLE 1

| POS | First SOS | Second SOS | Third SOS |
|---|---|---|---|
| (People Objects) | (Topic Objects) | (Document Objects) | (People Objects) |
| John James | Piano | Concert Technique | Stewart Jones |
| Kevin Johnson | Piano Composition | Piano Composing Guide | Molly Evans |
| BobSmith | Conducting | Young Conductor | Monica Swanson |
| Peter Zane | | Beginning Composition | |

If the user selects "Piano" in the first secondary object set, the ONV emphasizes the data objects "Piano Composing Guide" in the second secondary object set and "Molly Evans" and "Monica Swanson" in the third secondary object set. Those data items in the remaining secondary sets are emphasized because they are related to both the person "Bob Smith" from the primary object set and the topic "Piano" selected for context filtering from the first secondary object set. The display of the domain of data objects related to Bob Smith has effectively been filtered by the topic of piano so as to emphasize those data objects related to both Bob Smith and piano. Table 2 depicts this result, where the bolded and underscored "Piano" indicates its selection as the filtering data object, and the bolded "Piano Composing Guide," "Molly Evans" and "Monica Swanson" represent the cross-linked data objects that have been emphasized as being related to both the selected primary set data object and selected secondary set data object.

TABLE 2

| POS | First SOS | Second SOS | Third SOS |
|---|---|---|---|
| (People Objects) | (Topic Objects) | (Document Objects) | (People Objects) |
| John James | Piano | Concert Technique | Stewart Jones |
| Kevin Johnson | Piano Composition | Piano Composing Guide | Molly Evans |
| BobSmith | Conducting | Young Conductor | Monica Swanson |
| Peter Zane | | Beginning Composition | |

Selecting a data object from a different secondary object set results in clearing of the previous data object filter and using the newly selected data object as the filter. Thus, selecting "Molly Evans" from the third secondary object set results in clearing "Piano" as the filter. The ONV will now present a display emphasizing data objects related to both "Bob Smith" and "Molly Evans." In this example, "Piano" and "Conducting" from the first secondary object set and "Piano Composing Guide" and "Young Conductor" from the second secondary object set are emphasized because each is related to both Bob Smith and Molly Evans. This is depicted in Table 3, following the same conventions for bolding and underscore:

TABLE 3

| POS | First SOS | Second SOS | Third SOS |
|---|---|---|---|
| (People Objects) | (Topic Objects) | (Document Objects) | (People Objects) |
| John James | Piano | Concert Technique | Stewart Jones |
| Kevin Johnson | Piano Composition | Piano Composing Guide | MollyEvans |
| BobSmith | Conducting | Young Conductor | Monica Swanson |
| Peter Zane | | Beginning Composition | |

Additionally, multiple data items can be selected for additional filtering of the domain of objects. The data objects in the other secondary object sets will be emphasized if they are related to the current primary set data object and the selected secondary set data objects. Returning to Table 2, further selecting "Conducting" in the first secondary object set causes the document "Piano Composing Guide" to be de-emphasized because it is not related to both of topics "Piano" and "Conducting." Likewise, people object Molly Evans is de-emphasized for the same reason. Monica Swanson remains emphasized because it is related to topics "Piano" and "Conducting," and to person "Bob Smith." FIG. 4 below presents these results.

TABLE 4

| POS | First SOS | Second SOS | Third SOS |
|---|---|---|---|
| (People Objects) | (Topic Objects) | (Document Objects) | (People Objects) |
| John James | Piano | Concert Technique | Stewart Jones |
| Kevin Johnson | Piano Composition | Piano Composing Guide | Molly Evans |
| BobSmith | Conducting | Young Conductor | Monica Swanson |
| Peter Zane | | Beginning Composition | |

As noted above, the preferred embodiment provides for selecting data objects from a single secondary data set for context filtering. In the preferred embodiment, selecting a data object from a different secondary data set results in clearing of the data object filters from the old data set and application of the new one. An alternative embodiment permits selection of data objects from different secondary object sets as additional filters without clearing the old filter(s). Referring back to Table 2, the domain of objects, with Bob Smith as the entry node, has been filtered by the topic data object "Piano" to reveal that document "Piano Composing Guide" and person objects "Molly Evans" and "Monica Swanson" are related to both person "Bob Smith" and filter topic object "Piano." In this alternative embodiment, if second secondary object set document object "Piano Composing Guide" is further selected as a filter object, the remaining object set (third secondary object set, people objects) emphasizes only person object "Molly Evans," as reflected below in Table 5. This is because, in this example, "Molly Evans" is related to each of "Bob Smith," "Piano," and "Piano Composing Guide," while "Monica Swanson" happens to be unrelated to "Piano Composing Guide."

TABLE 5

| POS | First SOS | Second SOS | Third SOS |
|---|---|---|---|
| (People Objects) | (Topic Objects) | (Document Objects) | (People Objects) |

TABLE 5-continued

| POS | First SOS | Second SOS | Third SOS |
|---|---|---|---|
| John James | Piano | Concert Technique | Stewart Jones |
| Kevin Johnson | Piano Composition | PianoComposing Guide | Molly Evans |
| BobSmith | Conducting | Young Conductor Beginning Composition | Monica Swanson |
| Peter Zane | | | |

In sum, the ONV context filtering feature provides that multiple items can be selected from the secondary object sets which causes them to be effectively "ANDed" with the primary object set selection. Items in remaining secondary object sets are emphasized according to whether they are related to the selected items. One significant benefit that flows from context filtering is that it allows the same data to be viewed in different ways or contexts, so as to present the information infrastructure and reveal hidden meanings. By entering the domain of data objects via a given node, and viewing the domain "through" this node by progressive application of layered filters, the user can learn which data objects are interrelated, and which are not. Referring back to Table 2, the data entered into a database for Molly Evans and Monica Swanson may have had no indication of a piano-based relationship with Bob Smith. By selectively applying secondary object set object filters, the user is able to ascertain the basis and the extent of the relationship. This is a significant advantage. On the one hand, the domain database can be maintained and updated in a straightforward and more or less "mechanical" fashion. On the other, the ONV system and methods permit on-going "data mining" to ascertain complex, hidden relationships based on the evolving domain of data.

Emphasis Behavior

An aspect of the context filtering is emphasis behavior, namely how to present the filtered information to maximize the data mining performance. When context filtering is in effect, a data object in one of the other secondary object sets is either relevant or irrelevant. The secondary object set lists may be divided into two sublists, one for the relevant (cross-related) data items, and one for the irrelevant (non-cross-related items). It is preferred to present the information using emphasis/de-emphasis rather than merely deleting unrelated items. This is because the absence of a relationship is information in itself. In particular, the absence of a relationship for one data object juxtaposed against the recognition of a relationship for another data object may present information (context) too.

In the preferred embodiment, the two sublists are presented separately, each according to specified ordering (i.e., each is subject to the sorting function previously described), with the relevant data objects listed first. Items in the relevant list may be (further) emphasized from the irrelevant items using color, font or other graphical distinguishing means. Irrelevant items are not disabled, but can be selected as a data object filter, in which case the other secondary object sets are filtered accordingly.

View Pivoting

Because any object type is a valid entry point into the object network, the ONV system and methods make it possible to view the domain of information with any data object in the primary object set. View pivoting allows the user to view the same information along different domain "axes" by selecting an item in a secondary object set to make that item the currently selected item in the primary object set. Turning back to FIG. 1, this exemplary display depicts the primary people object set "along" the first secondary documents object set, second secondary topics object set and third secondary related people object set. The user can "pivot" the domain of data objects to project it along different axes, for example, by selecting "1998 Product Plan" from section 165 to make documents 140 the new primary object set with "1998 Product Plan" as the currently selected data object. The object set people 100 now becomes a secondary object set, along with topics 150 and related people 160. As before, the user can explore the very same data according to this new projection, using the relationship traversal, sorting, list filtering, and context filtering functions previously described.

To perform view pivoting, the user selects a command from a GUI menu or, alternatively, may click on the desired data object and "drag" it to the primary object set display area, using a mouse or like pointing device.

Specific Graphical User Interface Displays of the Object Network Viewer

Figure 2:
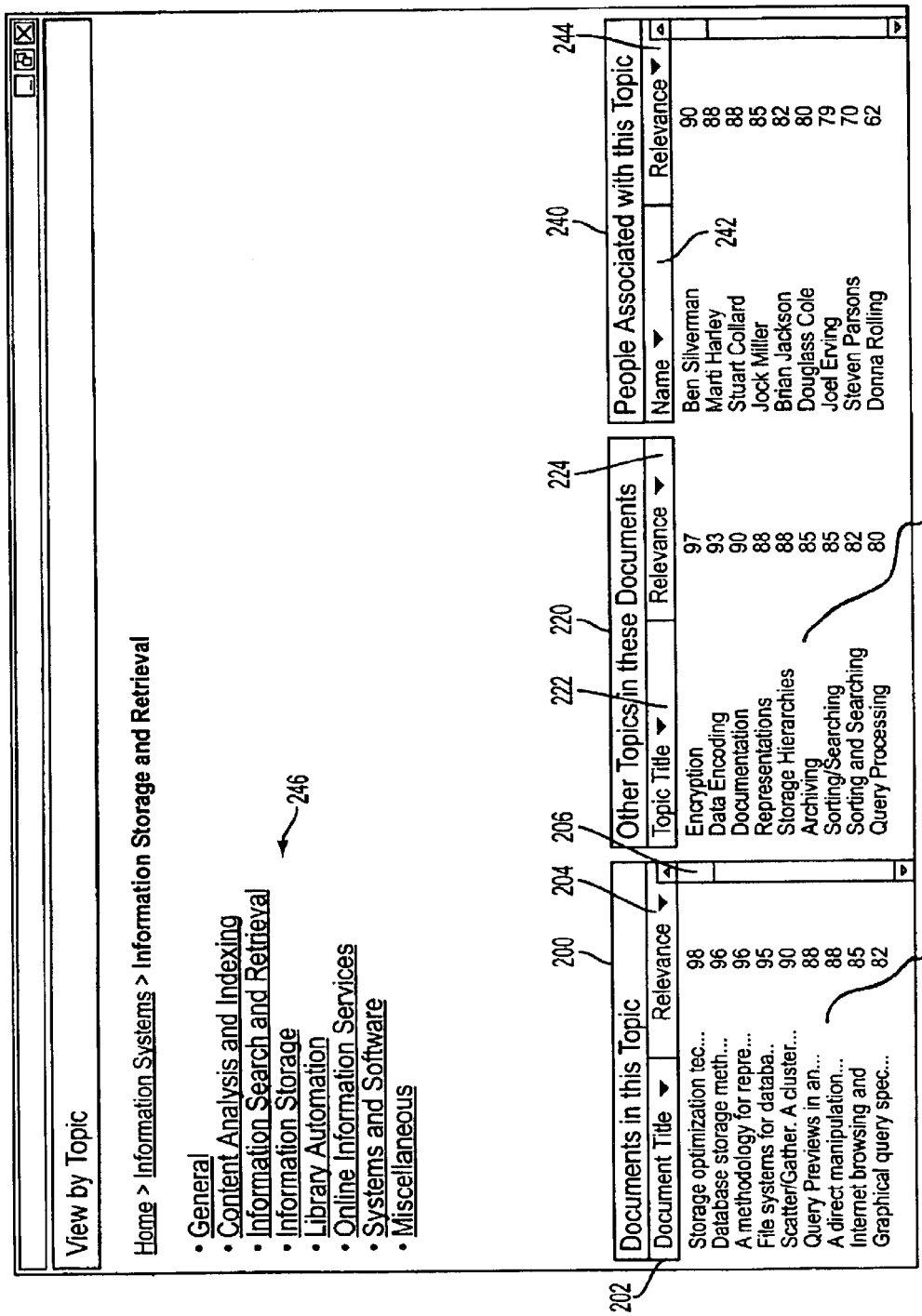
FIG. 2 is a diagram of a display including a primary object set, secondary object sets, and next-level secondary object sets in a list mode.

Having described the general operation of the invention, a number of different embodiments for presenting, manipulating and mining the domain of information are provided. FIG. 2 illustrates a display for a text version of the network viewer. FIG. 2 is a "View by Topic" page or display whereby "Information Storage and Retrieval" is the selected data object in the primary (topic) object set.

A bit of explanation is helpful regarding the structure of the primary topic data object, "Information Storage and Retrieval." In an embodiment of the invention, there may be a hierarchy of data objects such that each data object in an object set may have one or more so-called constituent objects (so-called "child" data objects) falling within the rubric of the parent data object. In turn, each child may have further children, and so on. Thus, there may be a hierarchical tree structure of data objects in a series of levels, as best illustrated by the data tree of FIG. 5.

With that in mind, it can be seen in the text-based display of FIG. 2 that "Information Storage and Retrieval" is the child of "Information Systems," further the child of "Home." The bulletized list of items 246 represents the child data objects of "Information Storage and Retrieval." As will be apparent from the discussion below, each level of the primary object set can be examined according to the various aspects of the invention (such as sorting, attribute filtering, context filtering and view pivoting) to explore the domain of information.

Turning back to FIG. 2, the relationship traversal aspect of the invention provides for the display of secondary object sets related to the selected topic "Information Storage and Retrieval." In this case, the following related secondary object sets are displayed: documents 200 and people 240. The first secondary object set documents 200 includes the document titles 202 and the list of document objects 208 related to the "Information Storage and Retrieval" topic object. Software scroll 206 permits scrolling of the secondary list items.

Also displayed is a characterization of the strength of the relationship between the selected primary object and the related secondary object set items, relevance 204. Relevance describes the relationship between two data objects and is quantified to give some indication of the strength of the relationship and to permit sorting. As in FIG. 2, documents 208 may be sorted according to descending relevance or, alternatively, relevance 204 could be clicked or otherwise selected to sort differently, such as in ascending order of relevance.

The relevance factor may be assigned initially and automatically updated. For example, if person X has authored a number of documents, this information may be stored in the ONV database. Each document is a data object in the entire document object set and each document may be related to one or more topics. When the ONV database is updated to add a document, some indicia of the relatedness of the document to, for example, topic A may be included. Eventually, the ONV recognizes through its data mining capability that person X has authored a series of documents, for example, documents 1–15, each with a relevance factor associated with topic A. By recognizing this cross-relationship (which may be recognized through the context filtering function), the ONV system can compute a relevance factor between person X and topic A taking into account the relevance of each of documents 1–15 to topic A.

Thus, it can be seen that the relevance factor is an important aspect of the present invention that enables the ONV not only to recognize or identify new relationships between data items, but also to characterize the strength of those relationships. Very often, it is the relative strength of those relationships that is key. For example, if the context filtering reveals that person X has a 50% relevance association with topic A and an 85% association with topic B, the user can draw inferences regarding person X's specialty or professional focus. If desired, the ONV system could permit the user to establish a threshold that stipulates the minimum value required to display a relationship.

Secondary people object set 240 identifies people data objects related to the primary topic data object "Information Storage and Retrieval," and includes names 242 and relevance 244.

Other topics 220 represents a slight variation on the secondary object set concept. Typically, a secondary object set represents a set of data objects which are related to the (current selected) primary data object in the primary object set. However, to facilitate data mining and, particularly, the discovery of hidden relationships, the present invention includes so-called "next-level secondary object sets." A next-level secondary object set is one that expresses a relationship between one of the secondary object sets and another object type.

Generally, next-level secondary object sets will be of an object type that is the same object type as the primary object set, although this is not required. Thus, a next-level secondary object set may be another person object set corresponding to a primary person object set, another document object set corresponding to a primary document object set, and so on. A next-level secondary object set may be produced by using a drop-down menu or click-and-point selection means to select a given secondary object set and define the object type for the next-level secondary object set that will be produced.

Thus, in the example of FIG. 2, other topics 220 represents a list of the other topics 250 associated with the list of documents 208 corresponding to primary topic object "Information Storage and Retrieval."

In one embodiment, the next-level secondary object set expresses the cumulative relationship to its secondary object set (i.e., topics list 250 represents the cumulative list of topics associated with all of documents 208). In another embodiment, the next-level secondary object set expresses a many-to-one relationship (i.e., list 250 pertains to one of the selected documents in list 208 and changes as different documents are selected).

Providing such a next-level secondary object set is beneficial in several ways. First, it conveys information to the user regarding the strength and complexity of the relationship between the primary topic object ("Information Storage and Retrieval") and the secondary document data objects (documents list 208) against the backdrop of other topic objects (topics list 250). In this case, the user appreciates that the documents related to "Information Storage and Retrieval" are also very related to the topic object "encryption," and somewhat related to "query processing."

Providing a next-level secondary object set also facilitates data mining. In this case, upon reflection the user may decide he/she is interested in finding people and documents associated with both "Information Storage and Retrieval" and "archiving."Accordingly, the user selects "archiving" for context filtering in order to identify documents and people related to both topics. Documents 200 and people 240 will be adjusted accordingly to emphasize their cross-related data objects.

Figure 3:
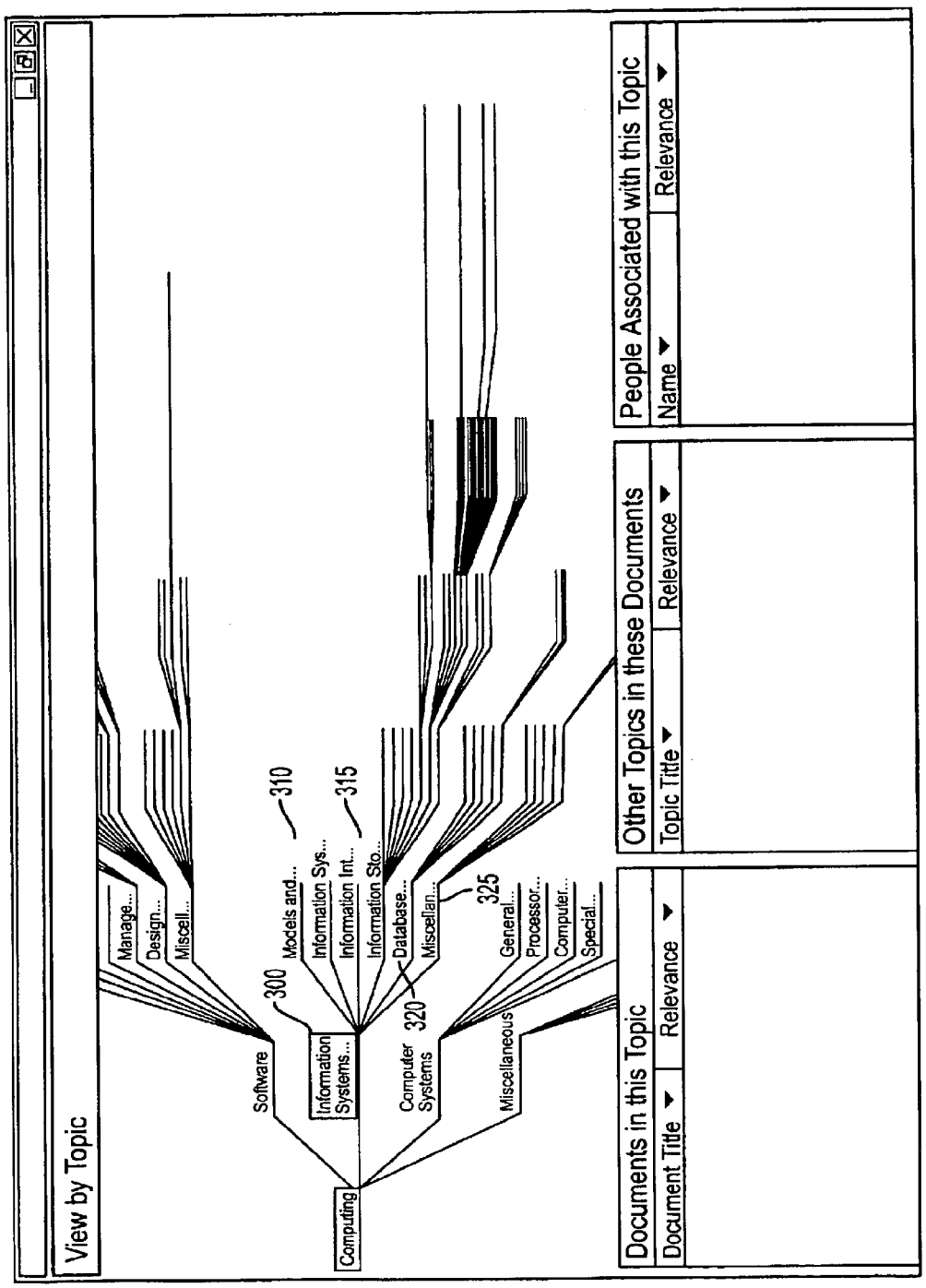
FIG. 3 is a diagram of a display showing a hierarchy of data objects where a user has selected one for relationship traversal and where the primary object set is presented in a tree-format.

FIG. 3 is similar to FIG. 2, except it shows how the hierarchy of data objects for the primary object type can be depicted as a tree. In this example, the selected primary data object is "Information Systems" 300 (indicated by the highlight) and its constituent members "Models and . . . ," "Information Sys . . . ," Information Int . . . ," "Information Sto . . . ," "Database . . . ," and "Miscellan . . ." 310 are also displayed. The user is using "Information Systems" 300 as the entry node, but the subsequent level of data objects 310 is displayed to provide further context. The user may select one of the items from the next level to refine his/her data mining activity. By clicking on "Information Systems" 300, so-called sibling data objects "Software," "Computer Systems" and "Miscellaneous" display their respective child data objects, as indicated by FIG. 3.

Figure 4:
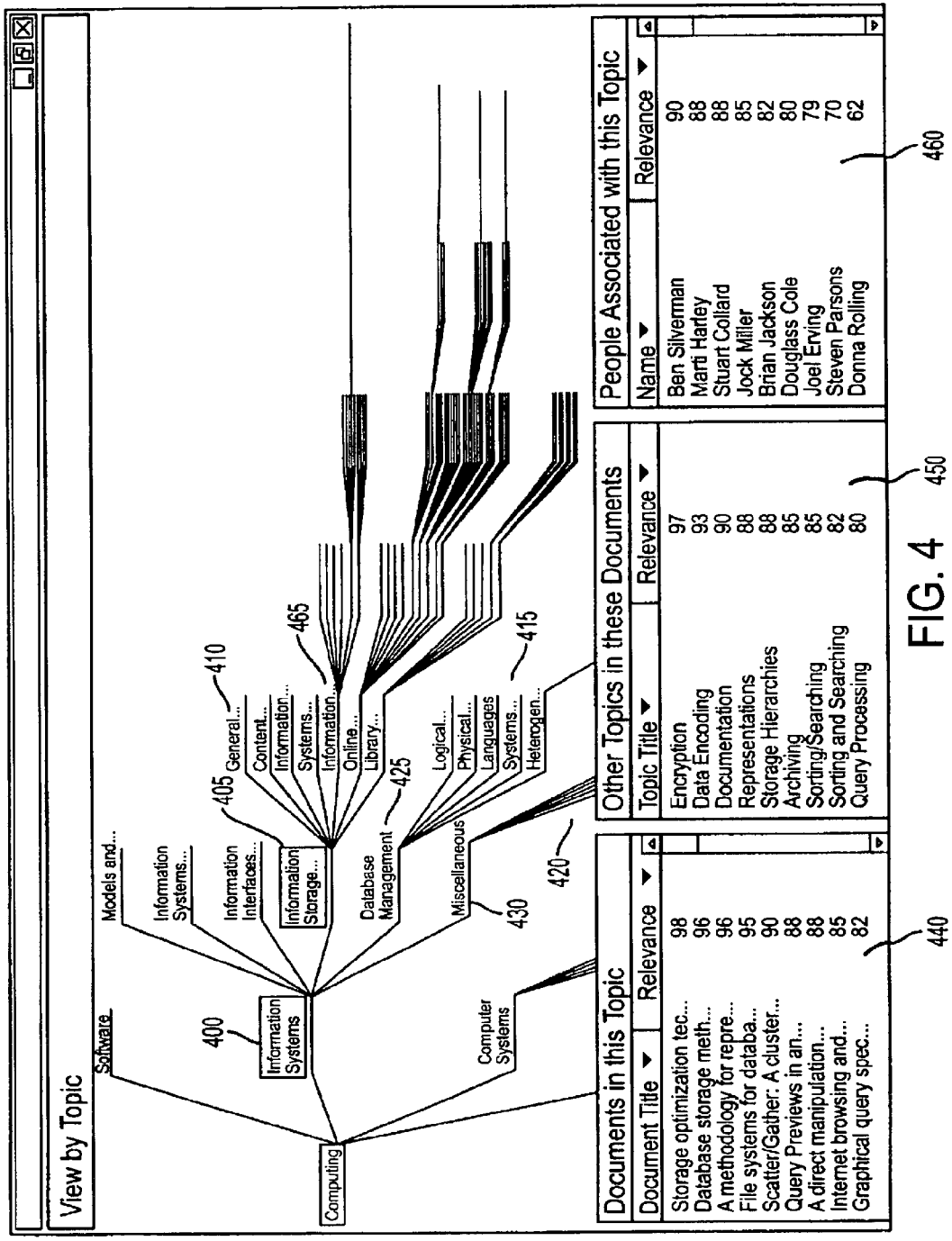
FIG. 4 is a diagram of a display showing how a user can move to a subsequent level in a hierarchy of data objects for relationship traversal.

FIG. 4 simply illustrates how the user can view further subsequent levels of the domain. From FIG. 3, the user has clicked on or otherwise selected "Information Stor . . . " 315 (FIG. 3), which causes the child data objects of it and its siblings to be displayed. Accordingly, FIG. 4 reflects the display of the child data objects 410 of "Information Storage . . . ," child data objects 415 of "Database Management" 425, child data objects 420 (hidden behind the "other topics" pane) of "Miscellaneous" 430, and those of the other siblings (not shown). Based on this presentation, the user has changed the selected primary data object from "Information Systems" 400 to "Information Storage" 405, as indicated by the highlight. Referring back to FIG. 2, it can be verified that the text-based and tree-based ONV display modes are at the same level in the domain of information. Display panes 440, 450 and 460 contain the same information as display panes 200, 220 and 240, respectfully.

Figure 5:
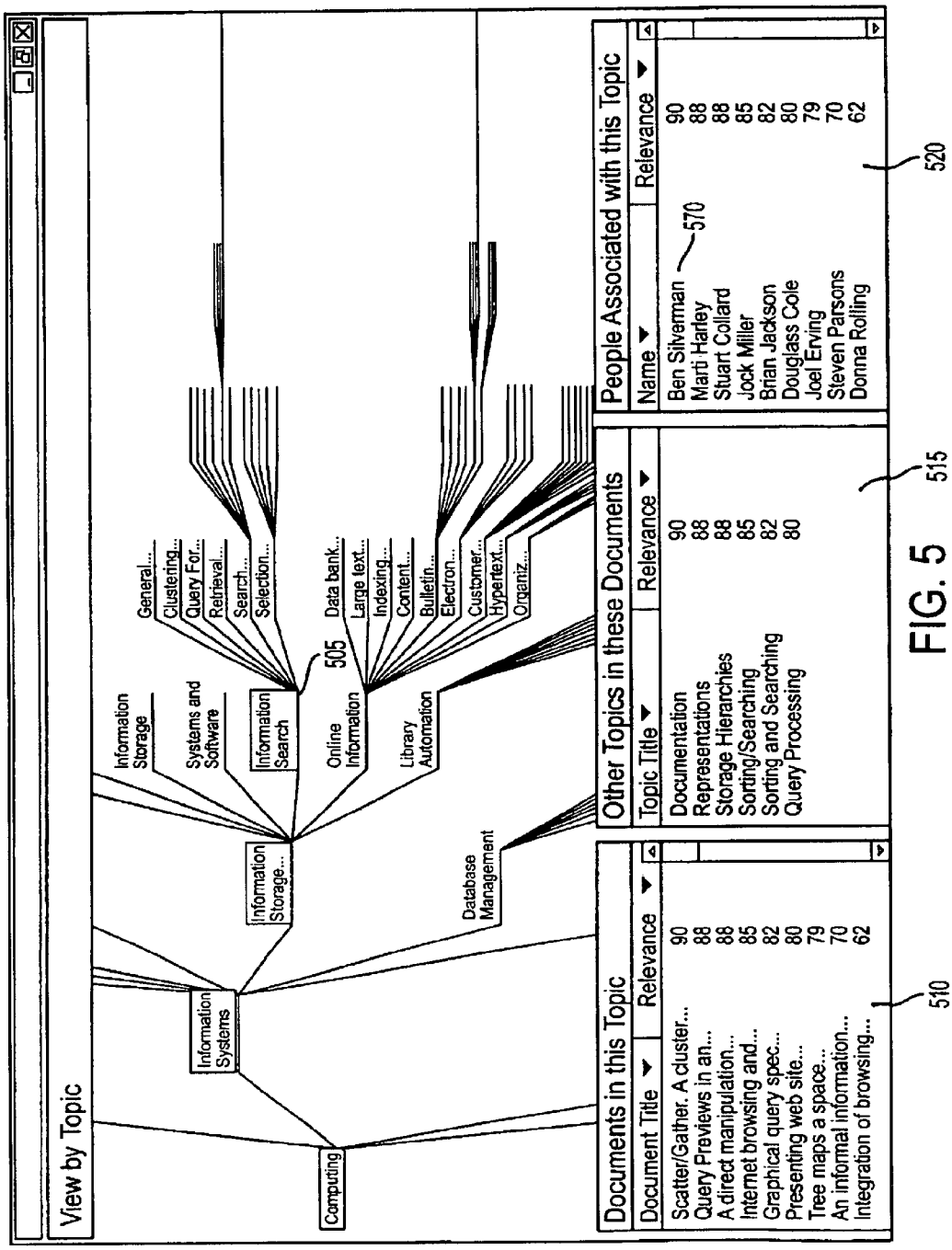
FIG. 5 is a diagram of a display showing how a user can move to a further subsequent level in a hierarchy of data objects for relationship traversal.

FIG. 5 reflects that the user has taken his/her data mining activity to the next level in the hierarchy by selecting "Information . . ." 465 (FIG. 4) corresponding to "Information Search . . ." 505. The child data objects of selected primary data object "Information Search . . ." 505 and its siblings are displayed. The secondary object sets corresponding to selected primary topic data object "Information Search . . ." 505 have changed, as reflected by display panes 510, 515, and 520.

Figure 6:
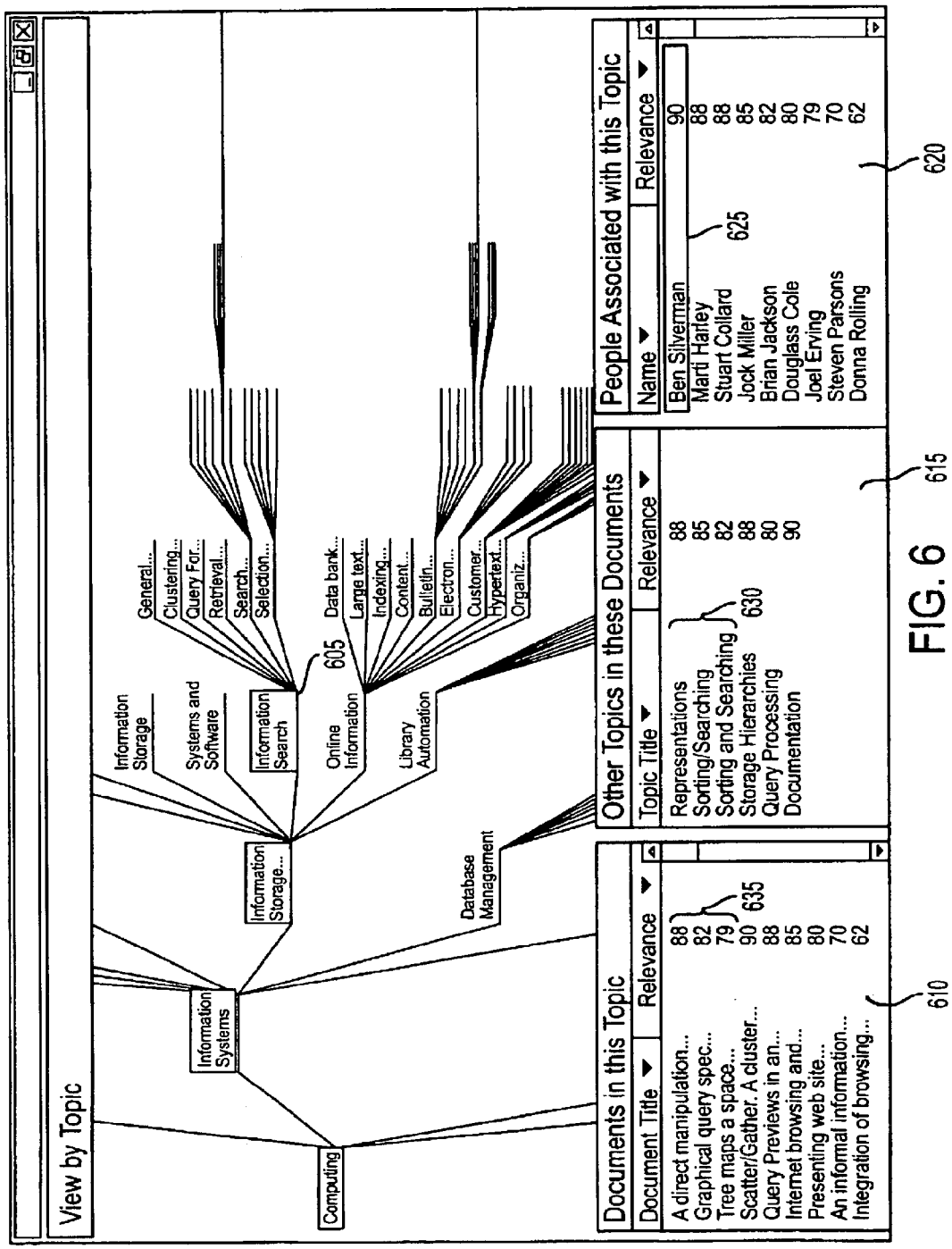
FIG. 6 is a diagram of a display showing how a user can select a data object to perform context filtering to identify cross-related data items.

FIG. 6 reflects the application of the context filtering function and emphasis functions to assist the user's data mining activity. In FIG. 6, "Information Search . . ." 605 is the selected primary topic data object and display pane 610 lists the corresponding documents for the topic, and display pane 620 lists the people associated with the topic. Next-level secondary object set display pane 615 lists the other topics associated with the documents in display pane 610. The user has engaged context filtering by selecting "Ben Silverman" 625 as a secondary object filter. Accordingly, the remaining secondary object sets (panes 610 and 615) are accordingly modified to emphasize those topics and (other) documents related to both the topic "Information Search . . ." and "Ben Silverman." This is reflected by emphasized (bolded) documents 635 and emphasized topics 630. As noted previously, the emphasis function could be incorporated via other means.

Figure 7:
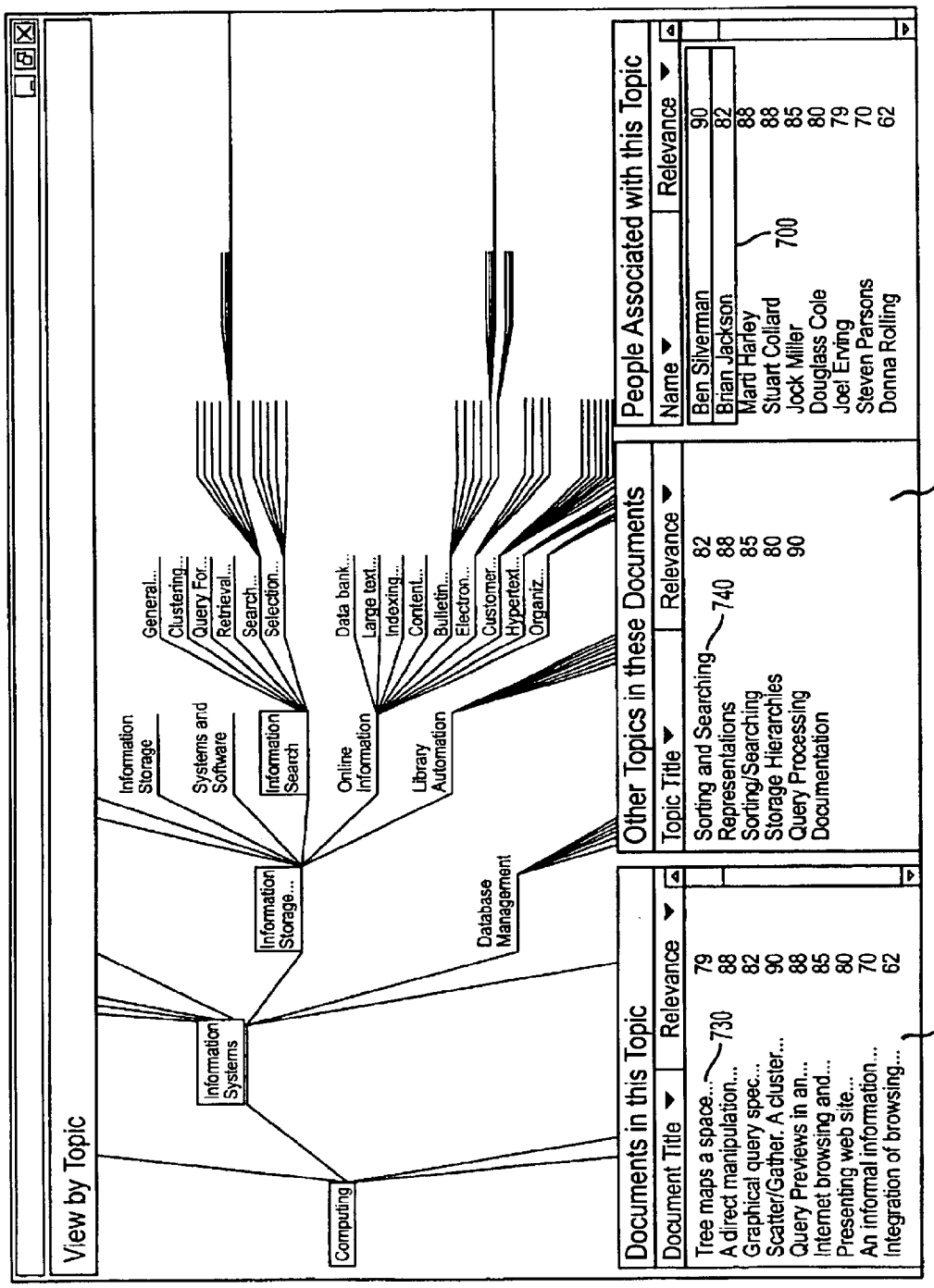
FIG. 7 is a diagram of a display showing how a user can select a second data object to perform context filtering using multiple data objects.

FIG. 7 reflects the addition of another layer of context filtering. The user desires to ascertain documents on the topic "Information Search . . ." related to both "Ben Silverman" and "Brian Jackson." The user selects "Brian Jackson" 700 and the lists of related documents 710 and other topics 720 are adjusted accordingly. In this example, the user learns that only one document, "Tree maps: a space . . ." 730 is related to the topic "Information Search..." and both individuals Ben Silverman and Brian Jackson. The user also learns that this one document is related to only one other topic, which is "Sorting and Searching" 740.

Figure 8:
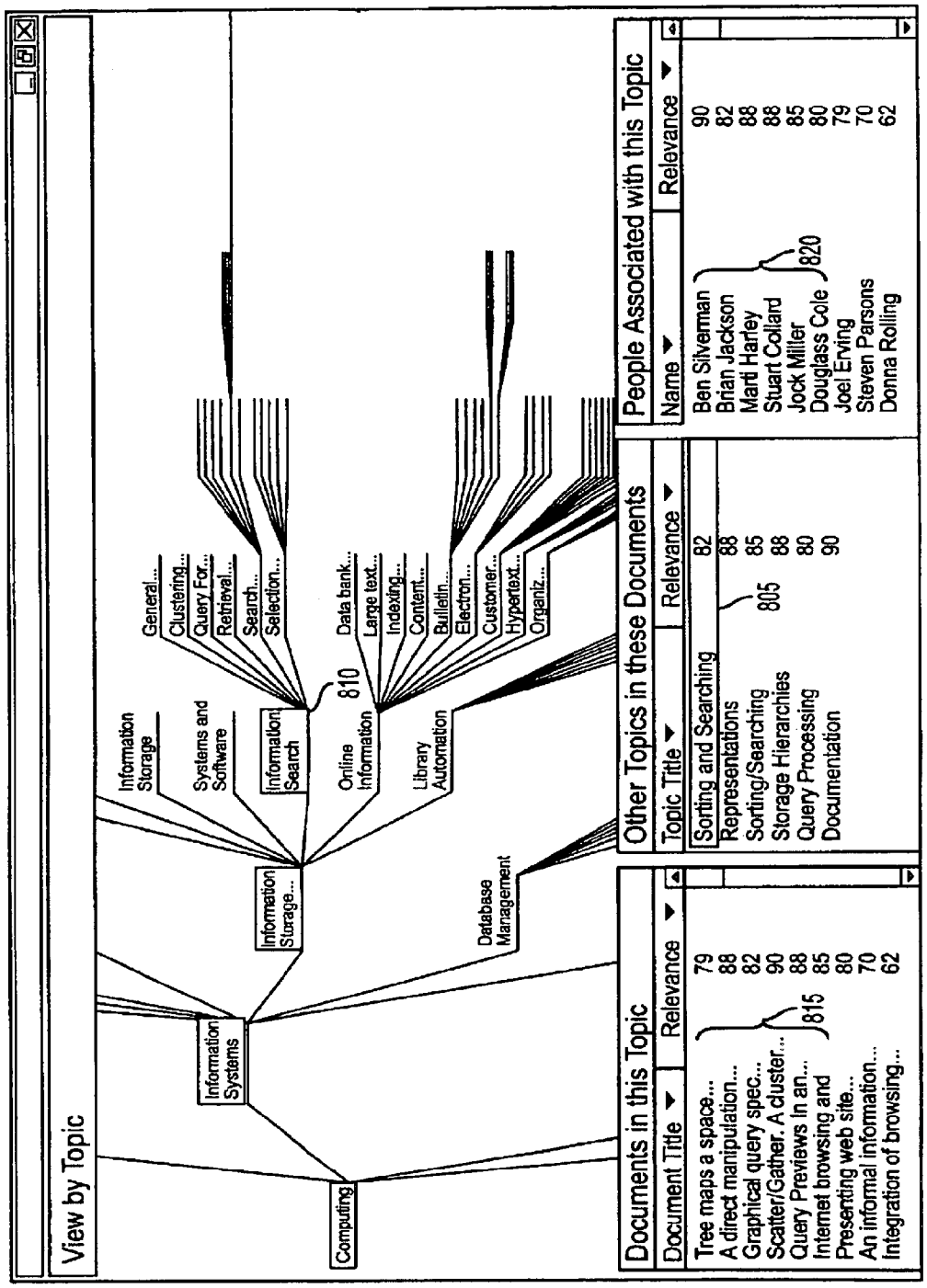
FIG. 8 is a diagram of a display showing how a user can perform context filtering using a data object in a different object set, here a next-level secondary object set.

FIG. 8 depicts how a user can use the ONV to filter according to different data objects. In FIG. 6, the user filtered the primary topic data object "Information Search . . ." 605 according to secondary people data object "Ben Silverman" 625. In FIG. 8, the user has selected "Sorting and Searching" 805 as the secondary data object filter. As discussed previously, the preferred embodiment provides that the previous filter data object ("Ben Silverman") is disabled upon the selection of a new one from a different secondary data set. Accordingly, the selected primary topic object "Information Search . . ." 810 is filtered by secondary topic "Sorting and Searching" 805 to render emphasized documents 815 and emphasized persons 820.

FIG. 9 illustrates the concept of view pivoting for the ONV in the list-based display format. Referring back to FIG. 5, it can be seen that the primary data object "Information Search . . ." 505 was selected to traverse the relationships to related documents 510 and related people 520. The user selects "Ben Silverman" 570 for view pivoting (by click and drag, menu selection or other means as previously discussed in connection with "View Pivoting") so that the domain of data objects is reprojected with "Ben Silverman" 905 as the so-called entry node or selected primary data object. With Ben Silverman as the new focal point, the ONV displays related documents 915, topics related to this person 920 and people linked to the documents 925.

A System for Exploring a Domain of Data Objects According to the Invention

Figure 10:
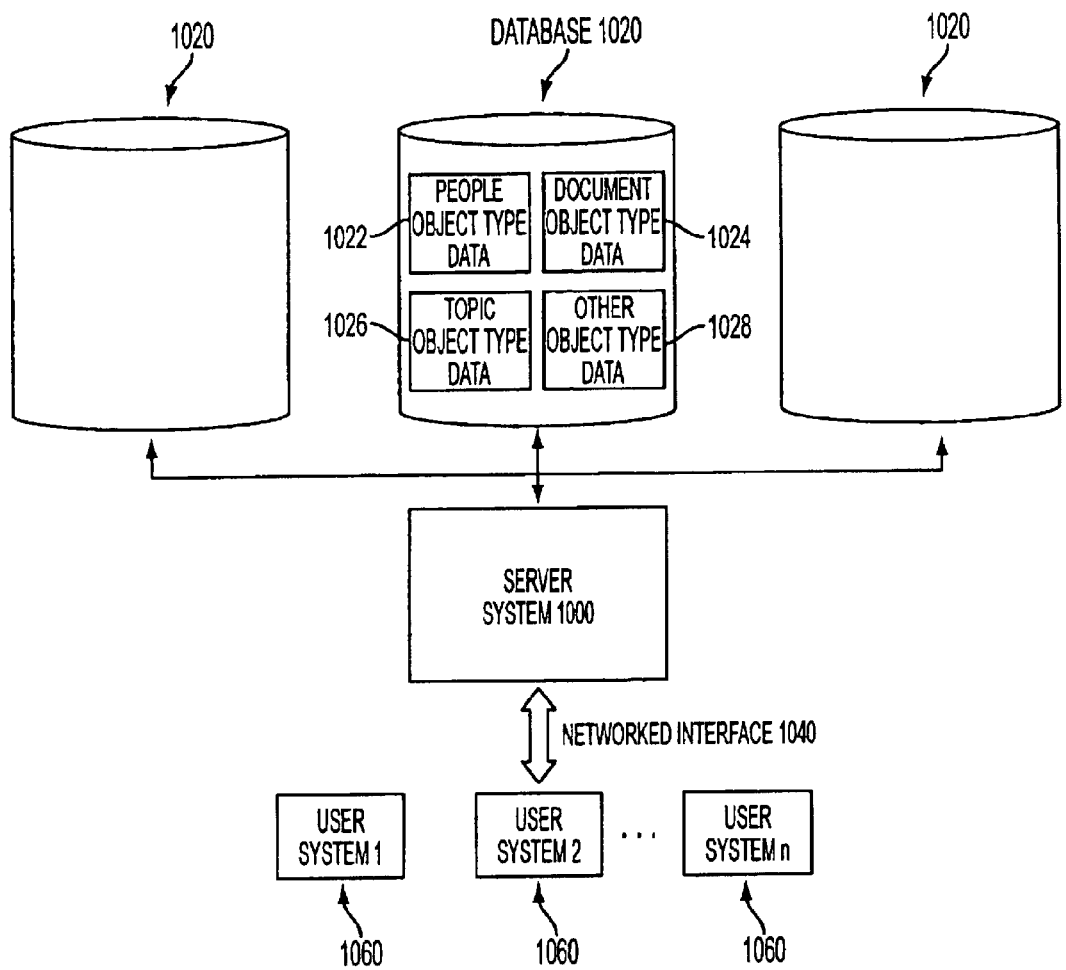
FIG. 10 is a diagram of a system for allowing a user to explore a domain of data objects, according to one embodiment of the invention.
Figure 11:
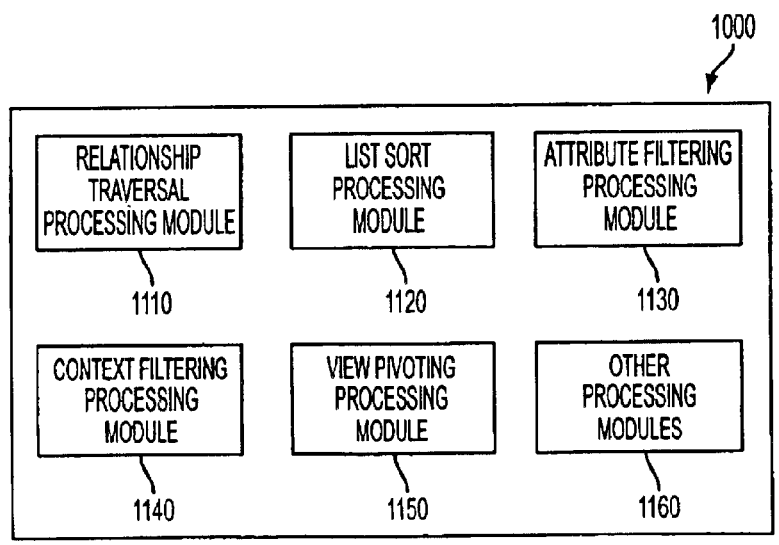
FIG. 11 is a diagram of a server system for allowing a user to explore a domain of data objects, according to one embodiment of the invention.

FIGS. 10 and 11 illustrate one exemplary embodiment of a system according to the present invention.

FIG. 10 comprises server system 1000, one or more user systems 1060, networked interface 1040, and one or more databases 1020. User systems 1060 may comprise any computer system capable of interfacing with server system 1000 through a network, including personal computers, minicomputers, microcomputers, and the like. Networked interface 1040 comprises any means for connecting users stations to a server system over a shared network, such as the Internet, World Wide Web, an intranet, wide area network, local area network, and the like. Databases 1020 comprises one or more databases containing the domain of data objects previously described, and may comprise such data modules as people object type data 1022, document object type data 1024, topic object type data 1026 and other object type data 1028.

FIG. 11 further illustrates the various processing modules hosted by server system 1000, comprising relationship traversal processing module 1110, list sort processing module 1120, attribute filtering processing module 1130, context filtering processing module 1140, view pivoting processing module 1150 and other processing modules 1160.

In general, the system illustrated by FIGS. 10 and 11 operates in accordance with the various operations previously described. The database for the domain of data objects resides in database(s) 1020, which can be accessed by user systems 1060 through a networked interface 1040. Of course, user systems 1060 could access database 1020 directly without a network interface 1040. Server system 1000 maintains the database and supports the various processing functions utilized by a user exploring the domain, as previously described. As a final note, those of skill in the art will appreciate that the architecture of the system according to FIGS. 10–11 is exemplary. The functional blocks are intended to convey the nature of the invention in a clear manner without undue complexity; said functional elements could easily be combined or further subdivided without departing from the spirit or scope of the invention.

A Method for Exploring a Domain of Data Objects According to the Invention

Figure 12:
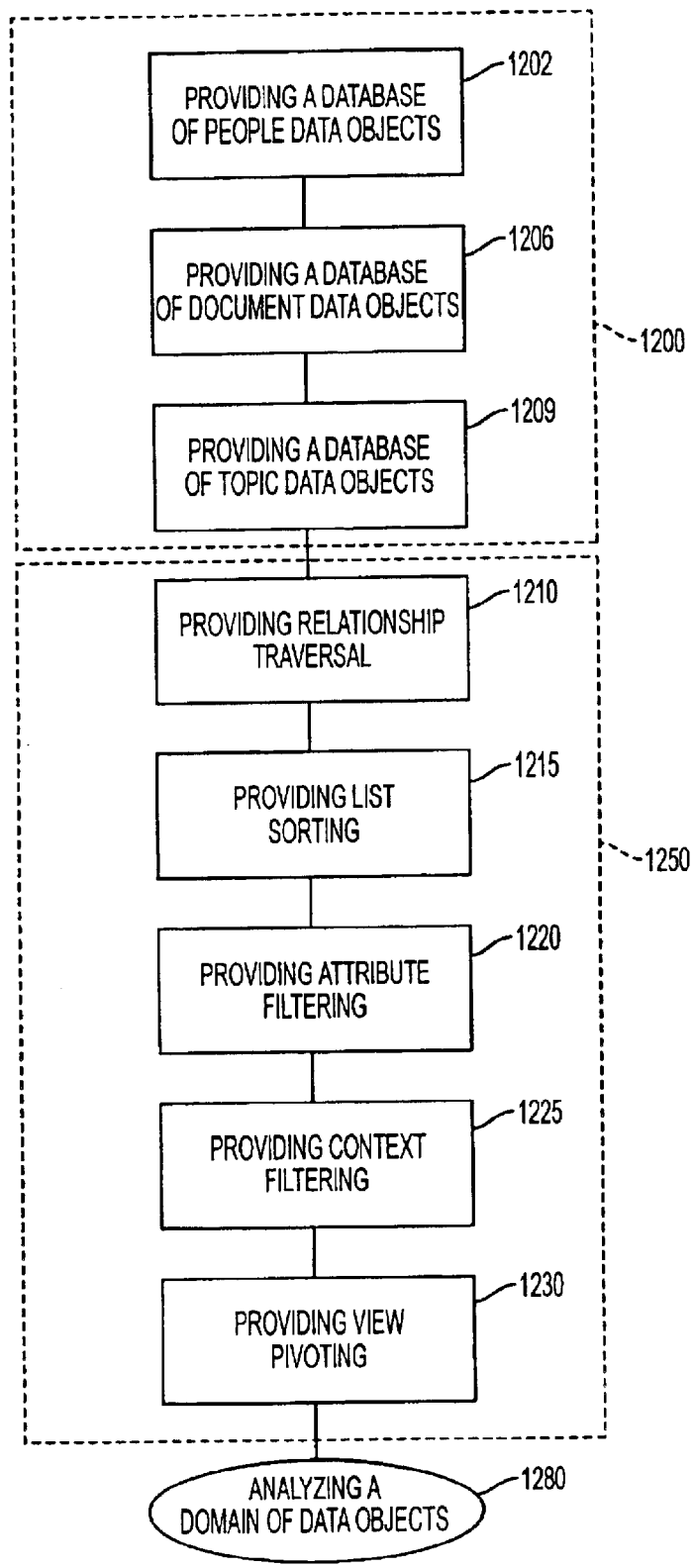
FIG. 12 is a flowchart describing a method for exploring a domain of data items according to the present invention.

FIG. 12 illustrates a method for exploring a network of data objects according to one embodiment of the invention. A database having a network of relatable data objects is provided according to step 1200. Step 1200 may include one or more of the following steps: providing a database of people data objects, as in step 1202; providing a database of document data objects, as in step 1206, and providing a database of topic data objects, as in step 1209. Processing means for exploring the network of relatable data objects are provided according to step 1250. Step 1250 may further include one or more of the following steps: providing relationship traversal, as in step 1210; providing list sorting, as in step 1215; providing attribute filtering, as in step 1220; providing context filtering, as in step 1225; and providing view pivoting, as in step 1230. Finally, the user analyzes a domain of data objects using the processing means, according to step 1280.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A system for analyzing stored data objects, comprising:

a server system;

one or more databases, said databases comprising stored data objects, said stored data objects comprising a plurality of object types;

at least one user system capable of accessing said stored data objects through said server system;

wherein:

said server system enables said at least one user system to display a primary object set and a plurality of secondary object sets concurrently for corresponding object types, and said server system enables at least one user to select one or more data objects within the primary object set to display associated data objects in the secondary object sets and to select one or more data objects within the secondary object sets to display related data objects within at least one of the primary object set and the secondary object sets that are related to both the selected one or more data objects within the primary object set and the selected one or more data objects within the secondary object sets, wherein displaying the selected one or more data objects within the primary object set and the secondary object sets includes emphasizing the selected one or more data objects within the primary object set and the secondary object sets with a first indicator and wherein displaying the related data objects within the primary object set and the secondary objects sets includes emphasizing the related data objects within the primary object set and the secondary object sets with a second indicator.

2. The system of claim 1, wherein said plurality of object types comprises document objects, topic objects and people objects.

3. The system of claim 1, wherein selection of one or more data objects within the secondary object sets enables the user to project the data objects along a different object type.

4. The system of claim 1, wherein the server system further enables selection of one or more data objects within the secondary object sets to filter the display according to the selected one or more data objects.

5. The system of claim 1, wherein said server system further enables the at least one user to sort or filter the primary object set according to attributes of the object types for corresponding primary object sets.

6. A system for analyzing stored data objects, comprising:
    database means associated with one or more server means for storing data objects comprising a plurality of object types;
    user system means for accessing the stored data objects in said database means;
    data processing means for enabling the user system means to associate a selected primary object set of a first object type with a related plurality of secondary object sets of a second object type stored in said database means;
    display means for enabling the user system means to display said selected primary object set and the secondary objects sets concurrently,
    wherein:
    said server means enables at least one user to select one or more data objects within the primary object set to display associated data objects in the secondary object sets and to select one or more data objects within one or more of the secondary object sets to display related data objects within at least one of the primary object set and the secondary object sets that are related to both the selected one or more data objects within the primary object set and the selected one or more data objects within the secondary object sets, wherein displaying the selected one or more data objects within the primary object set and the secondary object sets includes emphasizing the selected one or more data objects within the primary object set and the secondary object sets with a first indicator and wherein displaying the related data objects within the primary object set and the secondary objects sets includes emphasizing the related data objects within the primary object set and the secondary object sets with a second indicator.

7. The system according to claim 6, wherein said data processing means filters the selected primary object set according to the selected one or more data objects within the secondary object sets.

8. The system according to claim 6, wherein said data processing means enables selection of at least one data objects within the secondary object sets to pivot a domain of data objects and project the data objects along a different object type.

9. The system according to claim 6, wherein said display means generates a list-based graphical presentation of the selected primary object set and the related plurality of secondary object sets.

10. The system according to claim 6, wherein said display means generates a tree-based graphical presentation of the selected primary object set and the related plurality of secondary object sets.

11. A method of presenting relationships among stored data objects in a database, comprising:
    inputting into the database a first object type comprising a plurality of people data objects;
    inputting into the database a second object type comprising a plurality of document data objects;
    inputting into the database a third object type comprising a plurality of topic data objects; and
    selecting a primary object set from one or more of the stored data objects in order to identify a plurality of secondary object sets corresponding to the other data objects, to which the primary object set is related;
    displaying the primary object set and the secondary object sets concurrently; and
    enabling at least one user to select one or more data objects within the primary object set to display associated data objects in the secondary object sets and to select one or more data objects within the secondary object sets to display related data objects within at least one of the primary object set and the secondary object sets that are related to both the selected one or more data objects within the primary object set and the selected one or more data objects within the secondary object sets, wherein displaying the selected one or more data objects within the primary object set and the secondary object sets includes emphasizing the selected one or more data objects within the primary object set and the secondary object sets with a first indicator and wherein displaying the related data objects within the primary object set and the secondary objects sets includes emphasizing the related data objects within the primary object set and the secondary object sets with a second indicator.

12. The method of claim 11, further comprising the step of:
    sorting at least one of the primary and secondary object sets according to one or more attributes associated with the corresponding object set.

13. The method of claim 11, further comprising the step of:
    filtering at least one of the primary and secondary object sets according to one or more attributes associated with the corresponding object set.

14. The method of claim 11, further comprising the step of:
    filtering the primary object set according to one of the related data objects in the secondary object sets to identify cross-related data items.

15. The method of claim 11, further comprising the step of:
    selecting at least one of the data objects or one of said secondary object sets to pivot a domain of data objects and project the data objects along a different object type.

16. A storage medium for storing readable code, the machine readable code being executable to enable at least one user to explore relationships between stored data objects of a plurality of object types maintained in a system including a server, a database and at least one user system comprising:

computer readable program code for causing the server to receive a request from the at least one user of a selected primary object set, the selected primary object set including at least one primary data object, wherein the primary object set is selected by the at least one user or set by default;

computer readable program code for causing the server to identify a plurality of secondary object sets, with one or more secondary data objects, related to the at least one primary object set; and computer readable program code for generating a graphical user interface display of the primary object set including the at least one primary data object and the secondary object sets including corresponding secondary data objects;

computer readable program code for enabling the at least one user to select one or more primary data objects within the primary object set to display associated secondary data objects in the secondary object sets and to select one or more secondary data objects within the secondary object sets to display related secondary data objects that are related to both the selected one or more primary data objects within the primary object set and the selected one or more secondary data objects within the secondary object sets, wherein displaying the selected primary data objects and the selected secondary data objects includes emphasizing the selected primary data objects and the selected secondary data objects with a first indicator and wherein displaying the related secondary data objects includes emphasizing the related secondary data objects with a second indicator.

17. The storage medium of claim 16, further comprising:
computer readable program code for receiving a request from the at least one user to sort or filter at least one of the primary and secondary object sets according to an attribute associated therewith.

18. The storage medium of claim 16, further comprising:
computer readable program code for receiving a request from the at least one user to filter said primary object set according to one of the secondary data objects related to the primary data objects, and for presenting a display identifying cross-related data objects.

19. The system of claim 1, wherein said server system further enables the one user to select one of the secondary object sets to designate the selected secondary object set as a new primary object set and designates the primary object set as a secondary object set.

20. The system of claim 1, wherein at least one of the first indicator and the second indicator include at least one of a highlight, a color-code, an underscore, and an italicized font.

21. The system of claim 1, wherein the first indicator is the same as the second indicator.

22. The system of claim 1, wherein said server system enables the at least one user to select at least one object set from the primary object set and the secondary object sets and to select one of a plurality of data attributes associated with the data objects within the selected at least one object set and to order the data objects within the selected at least one object set according to the selected data attribute.

23. The system of claim 6, wherein said server means further enables the at least one user to select one of the secondary object sets to designate the selected secondary object set as a new primary object set and designates the primary object set as a secondary object set.

24. The system of claim 6, wherein at least one of the first indicator and the second indicator include at least one of a highlight, a color-code, an underscore, and an italicized font.

25. The system of claim 6, wherein the first indicator is the same as the second indicator.

26. The system of claim 6, wherein said server means enables the at least one user to select at least one object set from the primary object set and the secondary object sets and to select one of a plurality of data attributes associated with the data objects within the selected at least one object set and to order the data objects within the selected at least one object set according to the selected data attribute.

27. The method of claim 11, further comprising enabling the at least one user to select one of the secondary object sets to designate the selected secondary object set as a new primary object set and designating the primary object set as a secondary object set.

28. The method of claim 11, wherein at least one of the first indicator and the second indicator include at least one of a highlight, a color-code, an underscore, and an italicized font.

29. The method of claim 11, wherein the first indicator is the same as the second indicator.

30. The method of claim 11, further comprising enabling the at least one user to select at least one object set from the primary object set and the secondary object sets and to select one of a plurality of data attributes associated with the data objects within the selected at least one object set and ordering the data objects within the selected at least one object set according to the selected data attribute.

31. The storage medium of claim 11, further comprising computer readable program code enabling the at least one user to select one of the secondary object sets to designate the selected secondary object set as a new primary object set and designating the primary object set as a secondary object set.

32. The storage medium of claim 16, wherein at least one of the first indicator and the second indicator include at least one of a highlight, a color-code, an underscore, and an italicized font.

33. The storage medium of claim 16, wherein the first indicator is the same as the second indicator.

34. The storage medium of claim further comprising computer readable program code enabling the at least one user to select at least one object set from the primary object set and the secondary object sets and to select one of a plurality of data attributes associated with the data objects within the selected at least one object set and ordering the data objects within the selected at least one object set according to the selected data attribute.

35. A system for analyzing stored data objects, comprising:

a server system;

one or more databases, said databases comprising stored data objects, said stored data objects comprising a plurality of object types;

at least one user system capable of accessing said stored data objects through said server system;

wherein:

said server system enables said at least one user system to display only a primary object set and a plurality of secondary object sets for corresponding data objects, and said server system enables at least one user to select one or more data objects within the primary object set to display associated data objects in the secondary object sets and to select one or more data objects within the secondary object sets to display related data objects within at least one of the primary object set and the secondary object sets that are related to both the selected one or more data objects within the primary object set and the selected one or more data objects within the secondary object sets, wherein displaying the selected one or more data objects within the primary object set and the secondary object sets includes emphasizing the selected one or more data objects within the primary object set and the secondary object sets with a first indicator and wherein displaying the related data objects within the primary object set and the secondary objects sets includes emphasizing the related data objects within the primary object set and the secondary object sets with a second indicator.

36. The system of claim 35, wherein said server system further enables the at least one user to select one of the secondary object sets to designate the selected secondary object set as a new primary object set and designates the primary object set as a secondary object set.

37. The system of claim 35, wherein at least one of the first indicator and the second indicator include at least one of a highlight, a color-code, an underscore, and an italicized font.

38. The system of claim 35, wherein the first indicator is the same as the second indicator.

39. The system of claim 35, wherein said server system enables the at least one user to select at least one object set from the primary object set and the secondary object sets and to select one of a plurality of data attributes associated with the data objects within the selected at least one object set and to order the data objects within the selected at least one object set according to the selected data attribute.

40. A system for analyzing stored data objects, comprising:

a server system;

one or more databases, said databases comprising stored data objects, said stored data objects comprising a plurality of object types;

at least one user system capable of accessing said stored data objects through said server system;

wherein:

said server system enables said at least one user system to display a primary object set and a plurality of secondary object sets concurrently for corresponding object types, and said server system enables at least one user to select one or more data objects within the primary object set to display only associated data objects in the secondary object sets and to select one or more data objects within the secondary object sets to display only data objects within at least one of the primary object set and the secondary object sets that are related to both the selected one or more data objects within the primary object set and the selected one or more data objects within the secondary object sets, wherein the number of displayed data objects within at least one of the primary object set and the secondary object sets varies based upon the selected data objects.

41. The system of claim 40, wherein said server system further enables the at least one user to select one of the secondary object sets to designate the selected secondary object set as a new primary object set and designates the primary object set as a secondary object set.

42. The system of claim 40, wherein said server system enables the at least one user to select at least one object set from the primary object set and the secondary object sets and to select one of a plurality of data attributes associated with the data objects within the selected at least one object set and to order the data objects within the selected at least one object set according to the selected data attribute.

* * * * *